United States Patent
Schroth et al.

(10) Patent No.: US 11,976,728 B2
(45) Date of Patent: May 7, 2024

(54) SEALING DEVICE

(71) Applicant: Maag Automatik GmbH, Grossostheim (DE)

(72) Inventors: Jochen Schroth, Babenhausen (DE); Manfred Stark, Herford (DE)

(73) Assignee: MAAG AUTOMATIK GMBH, Grossostheim (DE)

( * ) Notice: Subject to any disclaimer, the term of this patent is extended or adjusted under 35 U.S.C. 154(b) by 474 days.

(21) Appl. No.: 17/071,447

(22) Filed: Oct. 15, 2020

(65) Prior Publication Data
US 2021/0116028 A1 Apr. 22, 2021

(30) Foreign Application Priority Data
Oct. 16, 2019 (DE) ...................... 10 2019 007 195.6

(51) Int. Cl.
*F16J 15/02* (2006.01)
*F16J 15/00* (2006.01)
(Continued)

(52) U.S. Cl.
CPC ........... *F16J 15/028* (2013.01); *F16J 15/002* (2013.01); *F16J 15/06* (2013.01); *B01D 29/05* (2013.01)

(58) Field of Classification Search
CPC ........ F16J 15/002; F16J 15/024; F16J 15/067; F16J 15/068; F16J 15/3488;
(Continued)

(56) References Cited

U.S. PATENT DOCUMENTS 5,114,161 A * 5/1992 Sgourakes ........... F16J 15/3204
                                                              277/500
5,507,498 A * 4/1996 Trott ...................... B01D 29/96
                                                              277/300
(Continued)

FOREIGN PATENT DOCUMENTS

DE         20121504 U1    2/2003
DE    102009035790 A1    2/2011
(Continued)

OTHER PUBLICATIONS

German Patent and Trademark Office, Examination Report, dated Oct. 5, 2020, pp. 1-5, German Application No. 102019007195.6.

*Primary Examiner* — Eugene G Byrd
*Assistant Examiner* — L. Susmitha Koneru
(74) *Attorney, Agent, or Firm* — WOODLING, KROST AND RUST

(57) ABSTRACT

The invention relates to a sealing device of a system for sealing a fluid passage from a first component (1) to a second component (2), comprising at least one first sealing element (3) which is of an annular design to allow fluid to pass through it, includes at least one expansion slot (4) and has a first sealing surface (5) sealingly associated with the first component (1) and has a second sealing surface (8) sealingly associated with the second component (2), said at least one first sealing element (3) being flexible and said expansion slot (4) being designed in such a way that radial and resultant axial pressure of the fluid passing through there will cause the first sealing element (3) to expand in the radial direction and thus press radially in the direction against the first component (1), with said first sealing surface (5) with the expansion slot (4) being sealed against the first component (1) by abutment in the direction of the latter, and in such a way that the first sealing element (3) will press axially in the direction against the second component (2), with the second (Continued)

sealing surface (8) with the expansion slot (4) being sealed against the second component (2) by abutment in the direction of the latter.

11 Claims, 5 Drawing Sheets

(51) Int. Cl.
*F16J 15/06* (2006.01)
*B01D 29/05* (2006.01)

(58) Field of Classification Search
CPC .... F16J 15/3484; F16J 15/348; F16J 15/3424; F16J 15/342; F16J 15/3416; F16J 15/3412; F16J 15/06; F16J 15/028; F16J 15/164; F16J 15/3272; F16J 15/106
See application file for complete search history.

(56) References Cited

U.S. PATENT DOCUMENTS

| | | | |
|---|---|---|---|
| 8,205,671 B1 * | 6/2012 | Branton | E21B 33/134 |
| | | | 166/217 |
| 9,260,936 B1 * | 2/2016 | Branton | F16J 15/166 |
| 10,309,189 B1 * | 6/2019 | Branton | E21B 33/128 |
| 2009/0045589 A1 * | 2/2009 | Patton | F16J 15/183 |
| | | | 277/516 |
| 2011/0180472 A1 * | 7/2011 | Woestmann | B01D 35/306 |
| | | | 210/236 |
| 2012/0326395 A1 * | 12/2012 | McCarthy | F16J 15/188 |
| | | | 29/428 |
| 2014/0070494 A1 * | 3/2014 | Winkelmann | F16J 15/166 |
| | | | 277/619 |
| 2021/0215253 A1 * | 7/2021 | Prate | F16J 15/18 |

FOREIGN PATENT DOCUMENTS

| | | | |
|---|---|---|---|
| EP | 2900350 B1 | 11/2019 | |
| GB | 1459253 A * | 12/1976 | F16J 15/56 |

* cited by examiner

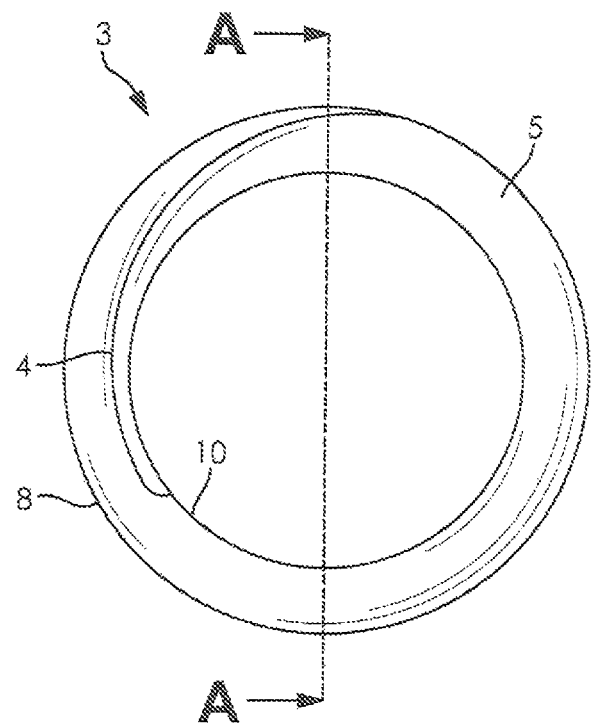
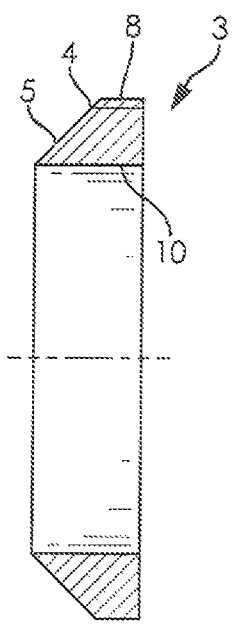 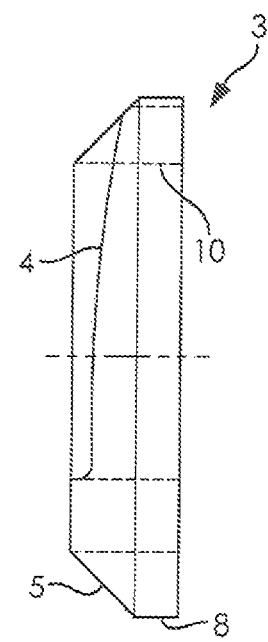
FIG. 1a
FIG. 1b
FIG. 1c

SEALING DEVICE

This application claims the priority of, and the benefit of German Patent Application Serial No. 10 2019 007 195.6 filed Oct. 16, 2019. German Patent Application Serial No. 10 2019 007 195.6 filed Oct. 16, 2019 is incorporated herein by reference hereto in its entirety.

The invention relates to a sealing device or a system for sealing a fluid passage from a first component to a second component, in particular for use in equipment processing plastic melts such as a melt filter.

A sealing device of this kind has at least one first sealing element that is of an annular design to allow fluid, preferably a low-viscosity plastic melt, to pass through it, and that includes at least one expansion slot, which at least first sealing element has a first sealing surface sealingly associated with a first component and has a second sealing surface sealingly associated with a second component.

In the prior art, annular seals made of PTFE material are generally used in flat slide screen changers, for example. Especially in the area of highly viscous plastic melts, very high temperatures will be encountered. However, prior art PTFE seals can only be used reliably up to maximum temperatures of approx. 250° C., and they are generally susceptible to leakage.

European patent application EP 2 900 350 A1 discloses a filter device for molten plastic material that uses an annular sealing element with an expansion slot. However, this sealing element is designed to have relatively large free slot widths in the region of said at least one expansion slot. This makes reliable sealing more difficult, since this type of seal design can lead to plastic melt penetrating constantly in the region of the expansion slot.

It is therefore the object of the present invention to provide a sealing device of a system for sealing a fluid passage from a first component to a second component, in particular for use with a low-viscosity plastic melt at relatively high temperatures, that provides reliable sealing based on a simple design, at the same time avoiding the disadvantages of the prior art.

The sealing device according to the invention or the system of a seal for sealing a fluid passage from a first component to a second component according to the invention, which fluid in particular is preferably a highly viscous plastic melt, in particular preferably of a relatively high temperature in the range exceeding 250° C., comprises at least one first sealing element that is of an annular design to allow fluid to pass through it and includes at least one expansion slot, as well as a first sealing surface sealingly associated with the first component and a second sealing surface sealingly associated with the second component. In accordance with the invention, said at least one first sealing element is of a flexible design and has its expansion slot formed in such a way that radial and resulting axial pressure of the fluid passing through there will cause the first sealing element to expand in the radial direction, thus pressing it radially in the direction towards the first component, in which case the first sealing surface with the expansion slot is sealed against the first component by abutment in the direction of the first component. Furthermore, the first sealing element is thus pressed axially in the direction towards the second component, in which case the second sealing surface with the expansion slot is sealed against the second component by abutment in the direction of the second component. In accordance with the invention, the flexible design with the expansion slot of the at least first component thus makes it possible, based on a simple design, to obtain a reliable sealing action with respect to both the first and second components as a result of a three-dimensional alignment of the first sealing element in the radial and resulting axial direction due to the respective pressure of the fluid passing through it. The pressure of the fluid passing through acts to essentially expand the at least one first sealing element in the radial direction and axially press it against the first or second component to be sealed.

This particularly simple design preferably allows the application of pressure in the radial and resulting axial direction in that the first sealing surface is inclined towards the axial direction, in particular in the manner of a conical surface. This may take the form of an external cone.

For this purpose, it is particularly preferred to provide a sealing surface inclined in the opposite direction, which is associated with the first component or the second component, which can be used for building up the axial pressure resulting when the inclined first sealing surface makes full contact.

In accordance with a preferred embodiment of the invention, the first sealing surface and the second sealing surface can be arranged at an angle relative to one another. However, it is particularly preferred for the first sealing surface and the second sealing surface to form a uniform sealing surface of the first sealing element.

The design according to the invention is particularly simple in the case where said first sealing element is formed in one piece and the at least one expansion slot is provided throughout the first sealing element.

According to an embodiment of the invention, the at least one expansion slot can be arranged in the manner of an arc that extends from an inner wall of the first sealing element to the second sealing surface.

For an as easy as possible introduction of the pressure of the fluid passing through the sealing device, the expansion slot extends in a radial direction, at least in the region of the inner wall of the first sealing element.

In order to provide a particularly simple and reliable design for a reliable sealing action and for preventing fluid from entering, or passing through, the expansion slot according to the invention in a particularly reliable manner, the at least one expansion slot—at least in the region of the second sealing surface of the first sealing element—preferably extends tangentially thereto. Consequently, any arising pressure will cause the expansion slot to be particularly reliably compressed in this region, thus completely or largely preventing melt from entering and from remaining there. This further increases the sealing effect achieved according to the invention.

The sealing effect of the present invention can be achieved particularly reliably if the device according to the invention or the corresponding system has a separate annular sealing seat located in the region of the first component and associated with the first sealing element, into which the first sealing element fits. Similarly, according to a preferred embodiment of the invention for achieving an improved sealing effect, the device or system according to the invention can be designed in such a way that the second component has a second sealing element, associated with the first sealing element, that is of an annular design to allow fluid to pass through it. The second sealing element can have a third sealing surface that is sealingly associated with the second component and bears against the second component, as well as a fourth sealing surface that is sealingly associated with the first sealing element and bears against the second sealing surface. This thus also provides a particularly reliable sealing action with respect to the second component.

Preferably, the second sealing element has a coefficient of thermal expansion which compensates for a flexible deformation of the first sealing element as a result of the pressure of the passing fluid, especially in a relatively high temperature range of 250° C. or above. This allows a particular reliable compensation of material tolerances, in particular of the pressure- and temperature-induced kind, which further improves the inventive sealing effect of the sealing device or system. It is particularly preferred for the first sealing element to consist of a stainless steel alloy and for the second sealing element to consist of a copper alloy.

Preferably, the first component is a melt filter device or a perforated plate of a melting device, and the second component is a flat slide of a melting device. As set out above, the sealing device or the corresponding sealing system can be used particularly advantageously in a melting device, especially for the processing of low-viscosity plastic melts.

The invention will now be explained in more detail with reference to the enclosed drawings. In the drawings:

FIGS. 1a to 1e are views of a preferred embodiment of the first sealing element of the sealing device according to the invention;

Figure 1D:
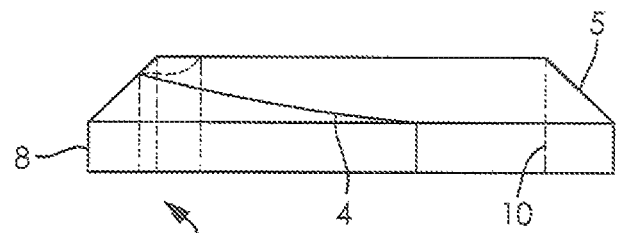
Figure 1E:
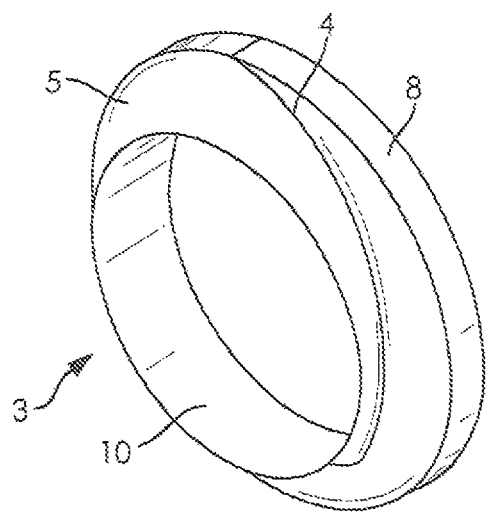
Figure 3:
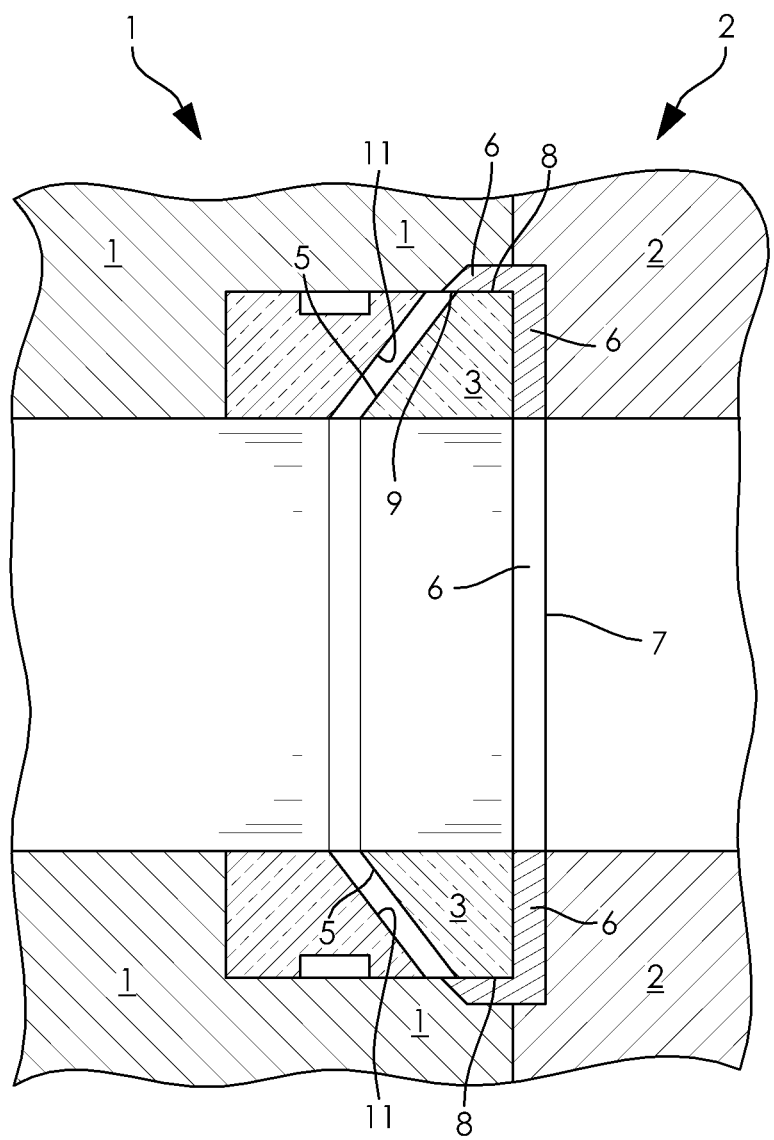
FIG. 3 is a cutaway side view of a sealing device of a system for sealing a fluid process, with a first component and a second component in an assembled state, according to the preferred embodiment of the invention.
Figure 3A:
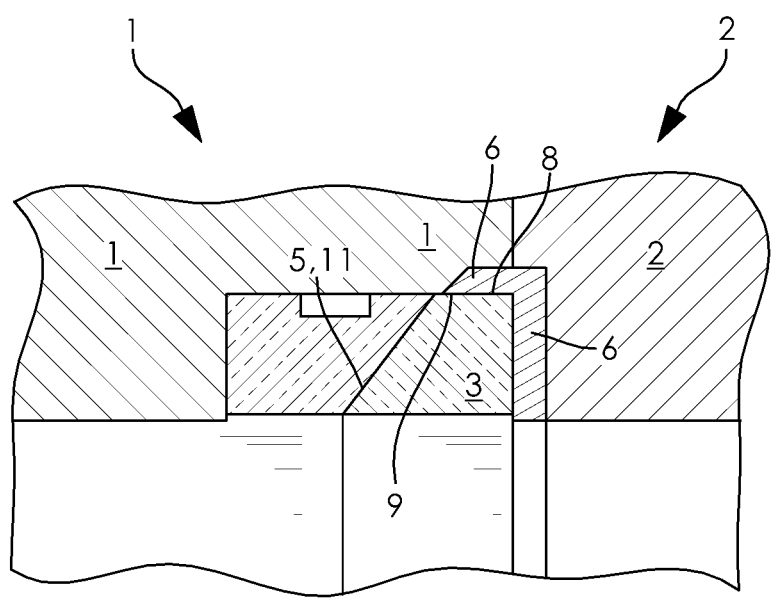

FIG. 1a is a top view of the at least one first sealing element 3 of the sealing device system according to the invention for sealing a fluid passage from a first component 1 to a second component 2, which two components are only shown in FIG. 3. This view clearly shows that the first sealing element 3 is of an annular design to allow fluid to pass through it and has at least one expansion slot 4. It also has a first sealing surface 5, which is inclined in the axial direction in the manner of a conical surface, as can be clearly seen, for example, in the sectional view of FIG. 1b or in the side views of FIG. 1c and FIG. 1d as well as in the perspective view of FIG. 1e. The first sealing element 3 is formed in one piece and the expansion slot 4 is arranged to extend continuously through it, with the expansion slot 4 extending in the manner of an arc from an inner wall 10 of the first sealing element 3 to the second sealing surface 8. The course of the expansion slot 4 is radial at least in the region of the inner wall 10 of the first sealing element 3 and then further extends in the manner of an arc until it terminates tangentially in the region of the second sealing surface 8 of the first sealing element 3. The present invention thus makes it possible in a simple manner that as a result of the melt pressure applied, both radial pressure acting on the first sealing element 3 and axial pressure acting on the sealing element 3 will ensure that as little melt as possible or no melt at all is present in the expansion slot 4 between the first component to be sealed and the second component to be sealed in a tensioned condition thereof. It can be clearly seen in the views of FIGS. 1a to 1e that the first sealing surface 5 and the second sealing surface 8 adjoin each other but are arranged at different angles from one another. According to the invention, it would also be conceivable (although this is not shown in the Figures) for the first sealing surface 5 and the second sealing surface 8 to form a uniform sealing surface of the first sealing element 3, if the sealing surface 8 were to directly adjoin the first sealing surface 5 at an identical cone angle, for example.

Figure 2A:
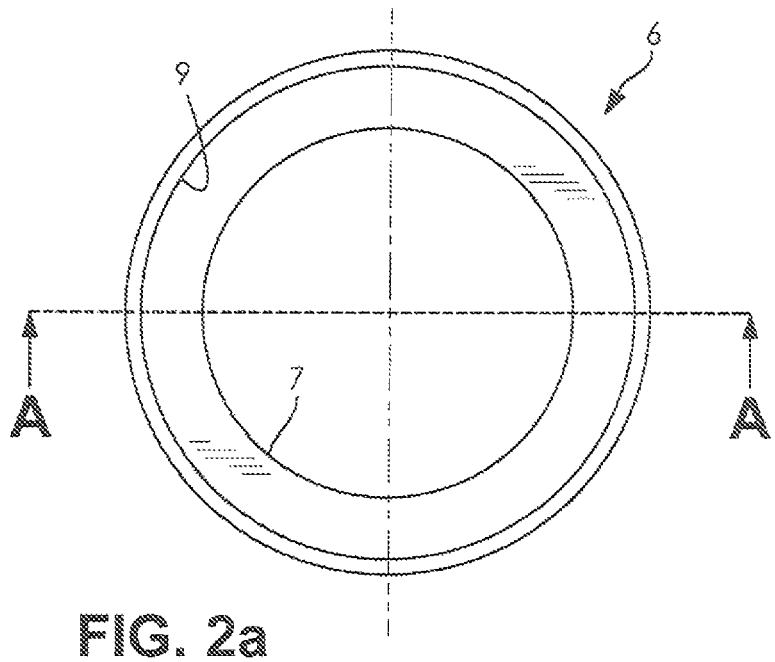
FIGS. 2a to 2c are views of a preferred embodiment of a second sealing element of the sealing device according to the invention.
Figure 2B:
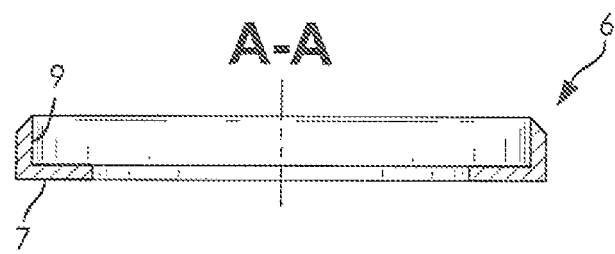
Figure 2C:
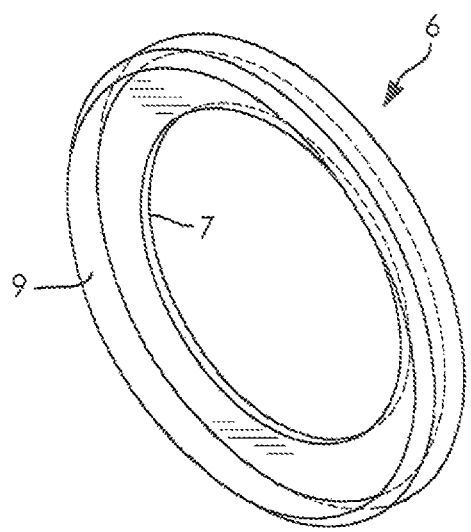

FIGS. 2a to 2c are views of a second sealing element 6 associated with the second component and the first sealing element 3, which sealing element 6 is also of an annular design to allow fluid to pass through it. The second sealing element 6 shown here has a third sealing surface 7 sealingly associated with the second component, which—in the assembled state of the device according to the invention—will rest against the second component, and a fourth sealing surface 9 sealingly associated with the first sealing element 3, which—in the assembled state of the device according to the invention—will rest against the second sealing surface 8 of the first sealing element 3. The first sealing element is inserted into the resulting recess of the second sealing element 6. It should be noted that in the edge area, which is clearly illustrated in the cutaway side view of the second sealing element 6 of FIG. 2, for example, the second sealing element has beveled edges, which—in the assembled state—essentially constitute a continuation of the edges of the conical surface of the first sealing element 3. According to the invention, the second sealing element 6 preferably has a coefficient of thermal expansion which allows a flexible deformation of the first sealing element 3 as a result of the pressure of the fluid passing through in the temperature range specified for the use of the sealing device according to the invention. This preferably results in an improved sealing effect by the compensation of tolerances.

FIG. 3 is a cutaway side view of the sealing system according to the invention with the sealing device according to the invention when assembled with the first component 1 and the second component 2. This view also clearly shows another separate annular seal seat 11, associated with the first sealing element 3 and the first component 1, with the seal seat 11 illustrated in this view forming an opposing conical contact element that matches the conically shaped portion of the first sealing element. According to the invention, the pressure force occurring radially can thus be deflected in the axial direction in a particularly easy manner by correspondingly placing the respective sealing surfaces against one another, which results in a kind of jamming of the first sealing element against the second sealing element and thus of the second sealing element against the second component. This also causes the first sealing element to be pressed against the first component 1 or against the respective seal seat 11, resulting in a corresponding sealing action.

The embodiment of the present invention shown thus allows for a particularly simple and reliable sealing of a fluid passage between two components, especially when used in melting devices for low-viscosity plastic melts at relatively high temperatures in the range of 250° C. and higher, according to the invention.

The invention claimed is:

1. System for sealing a fluid passage from a first component (1) to a second component (2), comprising:
   said first component (1) and said second component (2) radially define said fluid passage,
   said first component (1) and said second component (2) are arranged adjacent to each other in the direction of flow, and are configured to receive a sealing device,
   said first component (1) and said second component (2) abut each other in said fluid passage,
   said sealing device includes:
   a first sealing element (3),
   a second sealing element (6),
   said first sealing element (3) is annularly shaped to allow fluid to pass therethrough,
   said second sealing element (6) is annularly shaped to allow fluid to pass therethrough, said first sealing element (3) radially delimits said fluid passage, said first sealing element (3) includes an arcuate expansion slot (4), said first sealing element (3) has a first sealing surface (5) sealing against a second sealing element (6) and said first component (1), said first sealing element (3) has a second sealing surface (8) sealing against said second sealing element (6), said first sealing element (3) is flexible, said arcuate expansion slot (4) allows radial movement of said first sealing element (3), said first sealing surface (5) of said first sealing element (3) is inclined toward and forms an external conical surface in the axial direction of flow and due to radial movement of said first sealing element (3) as a result of radial pressure of said fluid passing through said fluid passage, said first sealing element (3) expands in said radial direction pressing radially against said first component (1) and said second sealing element (6), said first sealing surface (5) being sealed against said first component (1) by abutment, said first sealing element (3) presses axially against said second sealing element (6) in the axial direction of said second component (2), said second sealing element (6) resides within said first component (1) and said second component (2), said first sealing element (3) resides at least partially within said second sealing element (6), said second sealing element (6) has a third sealing surface (7) bearing against said second component (2), said second sealing element (6) has a fourth sealing surface (9) bearing against said second sealing surface (8) of said first sealing element (3), said second sealing surface (8) of said first sealing element (3) urges said fourth sealing surface (9) of said second sealing element (6) into engagement with said first component (1) and said second component (2), said second sealing surface (8) of said first sealing element (3) is sealed against said fourth sealing surface (9) of second sealing element (6) by abutment, said arcuate expansion slot (4) extends in an arc from an inner wall (10) of said first sealing element (3) to said second sealing surface (8) of said first sealing element, another separate annular seal having a sealing seat (11) forms an opposing conical contact element that matches said conically shaped portion of said first sealing element (3), said pressure force of said fluid passing through said fluid passage occurring radially is deflected in the axial direction of flow by said aforesaid respective sealing surfaces (5, 11) against one another, which results in jamming of said first sealing element (3) against said second sealing element (6) and against said first component (1), jamming said second sealing element (6) against said first component (1) and said second component (2) sealing said fluid passageway, and, said sealing surface (5) of said first sealing element (3) is pressed against said respective seal seat (11) of said another separate annular seal thus sealing said fluid passageway.

2. Device according to claim 1, characterized in that said first sealing surface (5) and said second sealing surface (8) form a uniform sealing surface of said first sealing element (3).

3. Device according to claim 1, characterized in that said first sealing element (3) is formed in one piece and said expansion slot (4) is continuous.

4. Device according to claim 1, characterized in that said expansion slot (4) extends in an arc from an inner wall (10) of said first sealing element (3) to said second sealing surface (8) of said first sealing element (3).

5. Device according to claim 4, characterized in that said expansion slot (4) extends radially with respect to said first sealing element (3) in said inner wall (10) of said first sealing element (3).

6. Device according to claim 1, characterized in that said expansion slot (4) extends and terminates tangentially from said second sealing surface (8) of said first sealing element (3).

7. Device according to claim 1, characterized in that said first sealing element (3) resides in a recess of said second sealing element (6), said recess formed by said third sealing surface (7) of said second sealing element (6) and said fourth sealing surface (9) of said second sealing element (6).

8. Device according to claim 7, characterized in that said second sealing element (6) has a coefficient of thermal expansion which compensates for a flexible deformation of said first sealing element (3) as a result of the pressure of said fluid passing through it.

9. Device according to claim 1, characterized in that said first component (1) is a perforated plate of a melting device filter and said second component (2) is a flat slide of a melting device.

10. Device according to claim 2 characterized in that said fluid is a low-viscosity plastic melt.

11. Device according to claim 2, characterized in that said first sealing element consists of a stainless steel alloy and said second sealing element consists of a copper alloy.

* * * * *